(12) United States Patent
Taylor et al.

(10) Patent No.: US 9,422,692 B2
(45) Date of Patent: Aug. 23, 2016

(54) SYSTEMS FOR PERFORMING NON-CONTACT BASED DETERMINATION OF THE POSITION OF AN IMPLEMENT

(71) Applicant: Caterpillar Trimble Control Technologies LLC, Dayton, OH (US)

(72) Inventors: Arthur James Taylor, Boulder, CO (US); Mark Nichols, Christchurch (NZ); Philip Jackson, Governors Bay (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

(21) Appl. No.: 13/795,945

(22) Filed: Mar. 12, 2013

(65) Prior Publication Data

US 2013/0282266 A1 Oct. 24, 2013

Related U.S. Application Data

(62) Division of application No. 10/928,070, filed on Aug. 26, 2004, now Pat. No. 8,478,492.

(30) Foreign Application Priority Data

Nov. 27, 1998 (SE) .......................... PCT/SE98/02167

(51) Int. Cl.
*G01C 21/00* (2006.01)
*E02F 9/26* (2006.01)
(Continued)

(52) U.S. Cl.
CPC ................. *E02F 9/264* (2013.01); *E02F 3/842* (2013.01); *E02F 3/847* (2013.01); *E02F 9/2045* (2013.01); *G01C 21/20* (2013.01); *G06F 17/00* (2013.01)

(58) Field of Classification Search
CPC ............. E02F 9/264; E02F 9/26; E02F 3/842; E02F 3/847; G01C 21/20; G01C 21/26; G05D 1/0246
USPC ............. 701/49, 50, 300, 408, 485, 495, 514, 701/519, 523; 172/430
See application file for complete search history.

(56) References Cited

U.S. PATENT DOCUMENTS 3,604,512 A 9/1971 Carter et al.
3,901,597 A 8/1975 White
(Continued)

FOREIGN PATENT DOCUMENTS

DE 10333012 10/2004
JP 07-150597 6/1995
(Continued)

OTHER PUBLICATIONS

Kugler, et al., "Combined use of GPS and LORAN-C in integrated navigation systems", *Fifth International Conference on Satellite Systems for Mobile Communications and Navigation*, 1996, (May 13-15, 1996),7-11.
(Continued)

*Primary Examiner* — Jack W Keith
*Assistant Examiner* — Chuong P Nguyen
(74) *Attorney, Agent, or Firm* — Kilpatrick Townsend & Stockton LLP

(57) ABSTRACT

Embodiments of the present invention are directed to systems for performing non-contact based determination of the position of an implement. In one embodiment, a non-contact based measurement system is used to determine the relative position of an implement coupled with a mobile machine. The geographic position of the mobile machine is determined and the geographic position of said implement based upon the geographic position of the mobile machine and the position of the implement relative to the mobile machine.

31 Claims, 7 Drawing Sheets

(51) Int. Cl.
E02F 3/84 (2006.01)
E02F 9/20 (2006.01)
G01C 21/20 (2006.01)
G06F 17/00 (2006.01)

(56) References Cited

U.S. PATENT DOCUMENTS

| | | | |
|---|---|---|---|
| 4,733,609 A | 3/1988 | Goodwin et al. | |
| 4,807,131 A | 2/1989 | Clegg | |
| 5,258,961 A | 11/1993 | Sehr et al. | |
| 5,404,661 A * | 4/1995 | Sahm et al. | 37/348 |
| 5,438,771 A | 8/1995 | Sahm et al. | |
| 5,477,459 A | 12/1995 | Clegg et al. | |
| 5,493,494 A | 2/1996 | Henderson | |
| 5,551,518 A | 9/1996 | Stratton | |
| 5,559,725 A * | 9/1996 | Nielson et al. | 700/302 |
| 5,602,741 A | 2/1997 | Talbot et al. | |
| 5,612,864 A | 3/1997 | Henderson | |
| 5,666,792 A * | 9/1997 | Mullins | 56/10.2 A |
| 5,848,485 A * | 12/1998 | Anderson et al. | 37/348 |
| 5,880,681 A * | 3/1999 | Codina et al. | 340/870.28 |
| 5,935,183 A * | 8/1999 | Sahm | E01C 19/006 172/4.5 |
| 5,987,371 A * | 11/1999 | Bailey et al. | 701/50 |
| 6,028,524 A | 2/2000 | Hartman et al. | 340/686.6 |
| 6,141,612 A * | 10/2000 | Flamme et al. | 701/50 |
| 6,199,000 B1 | 3/2001 | Keller et al. | |
| 6,324,455 B1 | 11/2001 | Jackson | |
| 6,418,364 B1 * | 7/2002 | Kalafut et al. | 701/50 |
| 6,581,695 B2 * | 6/2003 | Bernhardt et al. | 172/439 |
| 7,081,606 B2 | 7/2006 | Osaragi et al. | |
| 7,139,662 B2 | 11/2006 | Ericsson et al. | |
| 7,605,692 B2 * | 10/2009 | Yamada et al. | 340/438 |
| 7,831,362 B2 * | 11/2010 | Ishibashi et al. | 701/50 |
| 7,856,727 B2 * | 12/2010 | Chiorean et al. | 33/1 N |
| 7,890,235 B2 * | 2/2011 | Self et al. | 701/50 |
| 8,082,084 B2 * | 12/2011 | Nichols | 701/50 |
| 8,340,873 B2 | 12/2012 | Finley et al. | |
| 8,412,418 B2 | 4/2013 | Kumagai et al. | |
| 8,478,492 B2 | 7/2013 | Taylor et al. | |
| 2005/0187731 A1 * | 8/2005 | Ericsson et al. | 702/92 |
| 2005/0274879 A1 * | 12/2005 | Osaragi et al. | 250/231.13 |
| 2006/0012777 A1 | 1/2006 | Talbot et al. | |
| 2007/0052950 A1 | 3/2007 | Taylor et al. | |
| 2010/0121540 A1 * | 5/2010 | Kumagai et al. | 701/50 |
| 2011/0169949 A1 | 7/2011 | McCain et al. | 348/137 |
| 2011/0178677 A1 * | 7/2011 | Finley et al. | 701/33 |
| 2011/0311342 A1 * | 12/2011 | Montgomery | 414/685 |
| 2012/0236142 A1 | 9/2012 | Enix | |
| 2013/0275035 A1 | 10/2013 | Taylor et al. | |
| 2015/0106004 A1 | 4/2015 | Taylor et al. | |

FOREIGN PATENT DOCUMENTS

| | | |
|---|---|---|
| JP | 2002-070082 | 3/2002 |
| WO | WO-9904106 | 1/1999 |
| WO | WO-99/28565 | 6/1999 |

OTHER PUBLICATIONS

Enge et al., "Combining pseudoranges from GPS and LORAN-C for air navigation", *Position Location and Navigation Symposium*, 1990. 'The 1990's—A Decade of Excellence in the Navigation Sciences'. IEEE PLANS '90., IEEE, (Mar. 20-23, 1990),36-43.

* cited by examiner

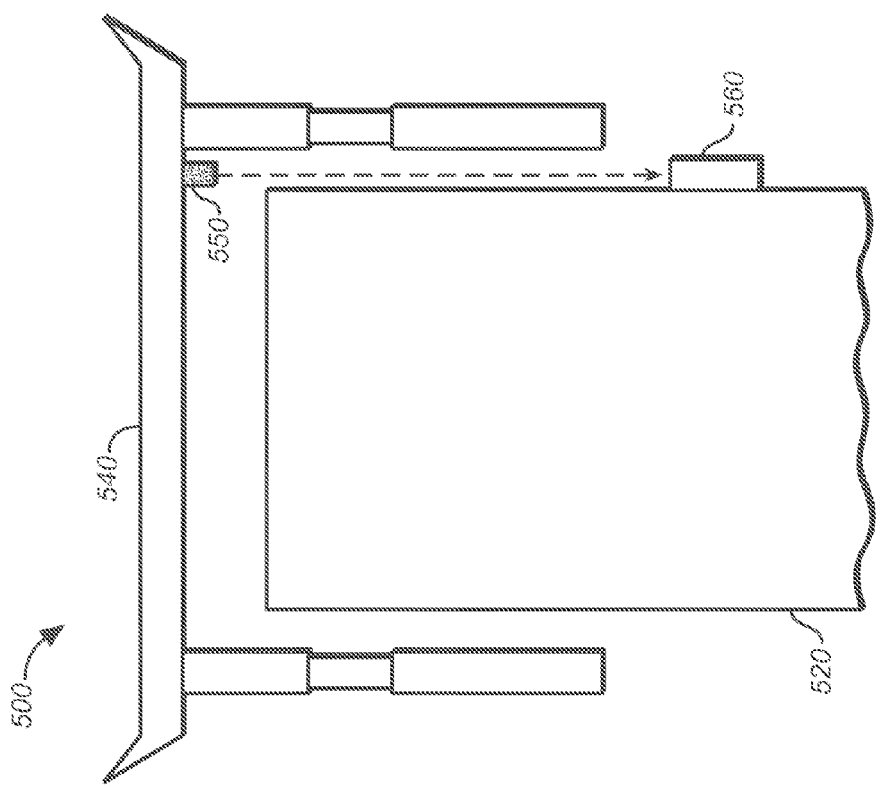
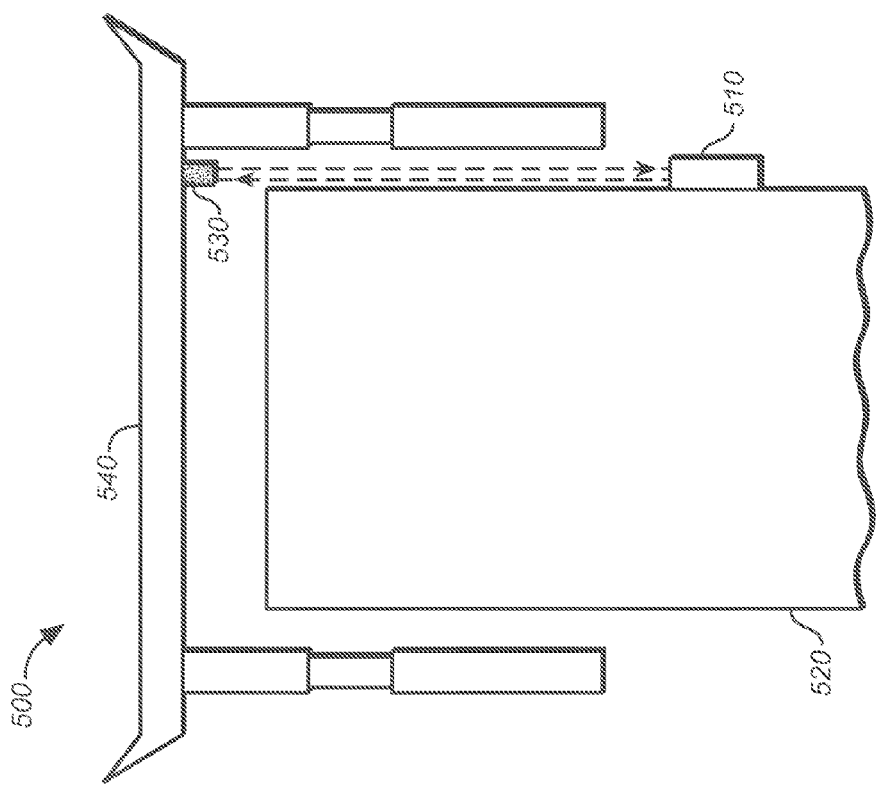

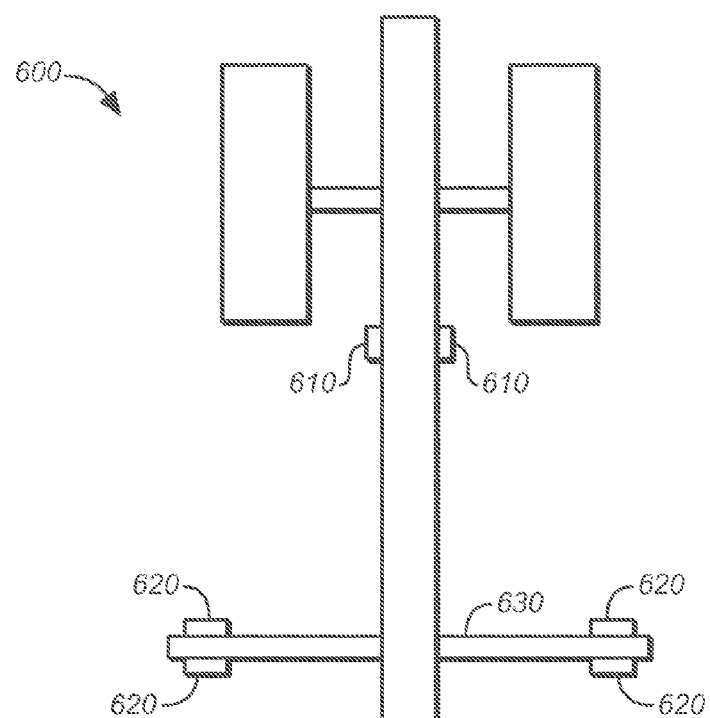
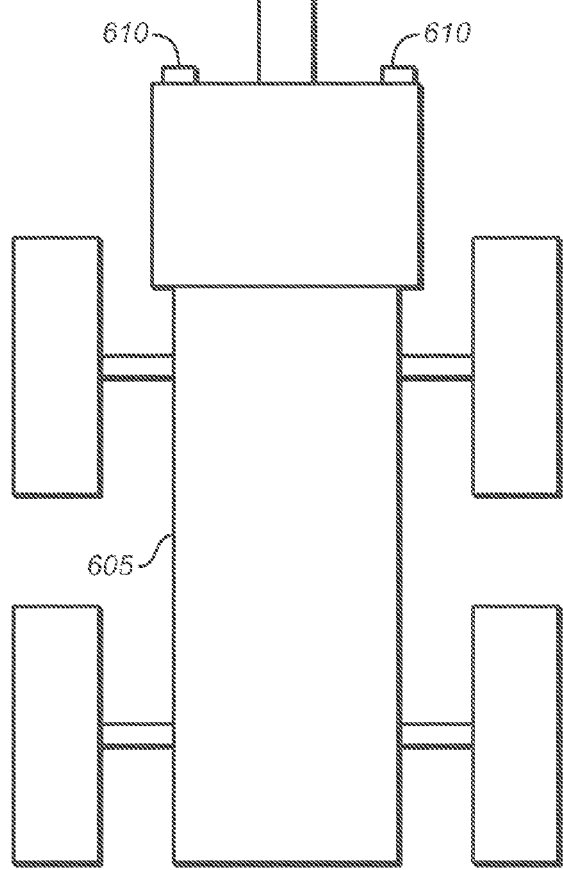
FIG. 6

SYSTEMS FOR PERFORMING NON-CONTACT BASED DETERMINATION OF THE POSITION OF AN IMPLEMENT

CROSS-REFERENCE TO RELATED APPLICATIONS

U.S. patent application Ser. No. 10/928,070 claimed priority to International Patent Application Number PCT/SE98/02167 by Lars Ericsson, et al., filed on Nov. 27, 1998, entitled "Device and Method or Determining the Position of a Working Part" and assigned to the assignee of the present application.

The present Application also claims priority to International Patent Application Number PCT/SE98/02167 by Lars Ericsson, et al., filed on Nov. 27, 1998, entitled "Device and Method or Determining the Position of a Working Part" and assigned to the assignee of the present invention.

FIELD OF THE INVENTION

Embodiments of the present invention are directed to position determination systems. More specifically, embodiments of the present invention are directed to a method and system for determining the position of an implement coupled with a mobile machine.

BACKGROUND OF THE INVENTION

Earth moving machines such as bulldozers, motor graders, scrapers, excavators, etc., are used to contour the ground for a variety of projects such as construction (e.g., roads, buildings, parks, and the like), mining, and agriculture. In order to achieve a pre-determined topography, it is important that soil is accurately removed from or added to selected areas. Therefore it is important to accurately control the operation of the working implement of the earth moving machine performing the contouring. More specifically, it is important to know the geographic location of the working edge of the implement (e.g., the bottom edge of a bulldozer blade) in 3 dimensions (e.g., latitude, longitude, and elevation) to accurately contour the site.

FIG. 1 shows a bulldozer 100 which uses a prior art positioning system to determine the location of the working edge 111 of bade 110. In FIG. 1, bulldozer 100 utilizes two masts (e.g., masts 112a and 112b), each of which are coupled with blade 110 and support a positioning system antenna (e.g., antennas 113a and 113b). Antennas 113a and 113b are used to receive data signals from a positioning system (e.g., global positioning system (GPS), Glonass, etc.) to determine the position of working edge 111. For example, antenna 113a receives a GPS signal which is typically used to determine the geographic position of antenna 113a in 3 dimensions. Similarly, antenna 113b receives a GPS signal which is used to determine its geographic position in 3 dimensions.

Because the vector from antenna 113a to corner 111a is known, the geographic position of corner 111a can be derived using the geographic position of antenna 113a. Similarly, the geographic position of corner 111b can be derived. Using this information, the geographic position of working edge 111 can be derived.

One disadvantage to the positioning system of FIG. 1 is the necessity of using masts 112a and 112b to support antennas 113a and 113b. Antennas 113a and 113b are not typically mounted directly on blade 110 because soil piling over the top of blade 110 will damage antennas 112a and 112b. Additionally, the masts elevate antennas 113a and 113b to improve reception of the positioning system signals. Therefore masts 112a and 112b are used to isolate antennas 113a and 113b from this type of damage. However, when working in areas with overhanging tree branches and/or heavy brush, antennas 112a and 112b are still exposed to physical damage from the branches.

Another disadvantage of the positioning system of FIG. 1 is that the wires 114a and 114b coupling antennas 113a and 113b with a control unit 115 are exposed and susceptible to damage (e.g., from overhanging branches and/or brush). Additionally, antennas 113a and 113b are exposed to a significant amount of vibration when blade 110 is being used, which can damage the antennas over time.

FIG. 2 shows an exemplary motor grader 200 using a prior art positioning system similar to the positioning system described above with reference to FIG. 1. In the embodiment of FIG. 2, masts 212a and 212b couple antennas 213a and 213b with blade 210. In addition to the disadvantages discussed above with reference to FIG. 1, when used with a motor grader, masts 212a and 212b significantly restrict the range of motion of blade 210. For example, blade 210 can be rotated in 3 dimensions with respect to motor grader 200 and can be offset from the center line axis of motor grader 200 such that it extends to one side or the other of motor grader 200. Thus, a motor grader without masts 212a and 212b can typically extend blade 210 to the left until the right side edge of blade 210 is directly under the center axis of beam 220 of motor grader 200. However, this range of motion for blade 210 is prevented in the embodiment of FIG. 2 by masts 212a and 212b.

Using contact-based measurement systems to determine the position of the blade are disadvantageous in that they require some or all of: stepper motors, potentiometers, accelerometers, etc., to determine the position of the blade. These components can be incorporated into the machine when it is built, or an after-market kit can be installed upon the vehicle. However, incorporating these components into the machine when it is built can be too expensive for some users and the after-market kits are still subject to the damage as described above.

SUMMARY OF THE INVENTION

Accordingly a need exists for a position determining system that can determine the location of an implement relative to a mobile machine to which it is coupled. While meeting the above stated need, it is advantageous for such a system to not restrict the range of motion of the implement. It is further advantageous to remove components of the position determining system from masts coupled with the implement to reduce the likelihood of damaging the components. Additionally, while meeting the above stated needs, it is advantageous that the position determining system may be installed on the mobile machine as an aftermarket kit.

Embodiments of the present invention provide a position determining system that can determine the location of an implement relative to a mobile machine to which it is coupled. Additionally, embodiments of the present invention are less likely to restrict the range of motion of the implement while determining the location of the implement relative to a mobile machine to which it is coupled. Furthermore, embodiments of the present invention do not require the use of a mast-mounted system for determining the location of the implement relative to the mobile machine, thus reducing the likelihood of damaging components of the position determining system.

In one embodiment, a non-contact based measurement system is used to determine the relative position of an implement coupled with a mobile machine. The geographic position of the mobile machine is determined and the geographic position of the implement is determined based upon the geographic position of the mobile machine and the position of the implement relative to the mobile machine.

Embodiments of the present invention do not necessitate mounting antennas for a position determining system on masts coupled with the implement being used by the mobile machine in order to determine the geographic position of the working edge of the implement. This is advantageous because embodiments of the present invention reduce the likelihood of damaging the position determining system antennas and are less likely to restrict the range of motion of the implement while it is being used. Furthermore, embodiments of the present invention determine the position of the implement relative to the mobile machine without requiring measurement of the complete linkage geometry of each component disposed between the implement and the mobile machine. As a result, embodiments of the present invention can be more readily installed as an after market kit.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIGS. 5A and 5B show a non-contact based measurement system used in accordance with embodiments of the present invention.

FIG. 6 shows a non-contact based measurement system implemented on a motor grader in accordance with embodiments of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
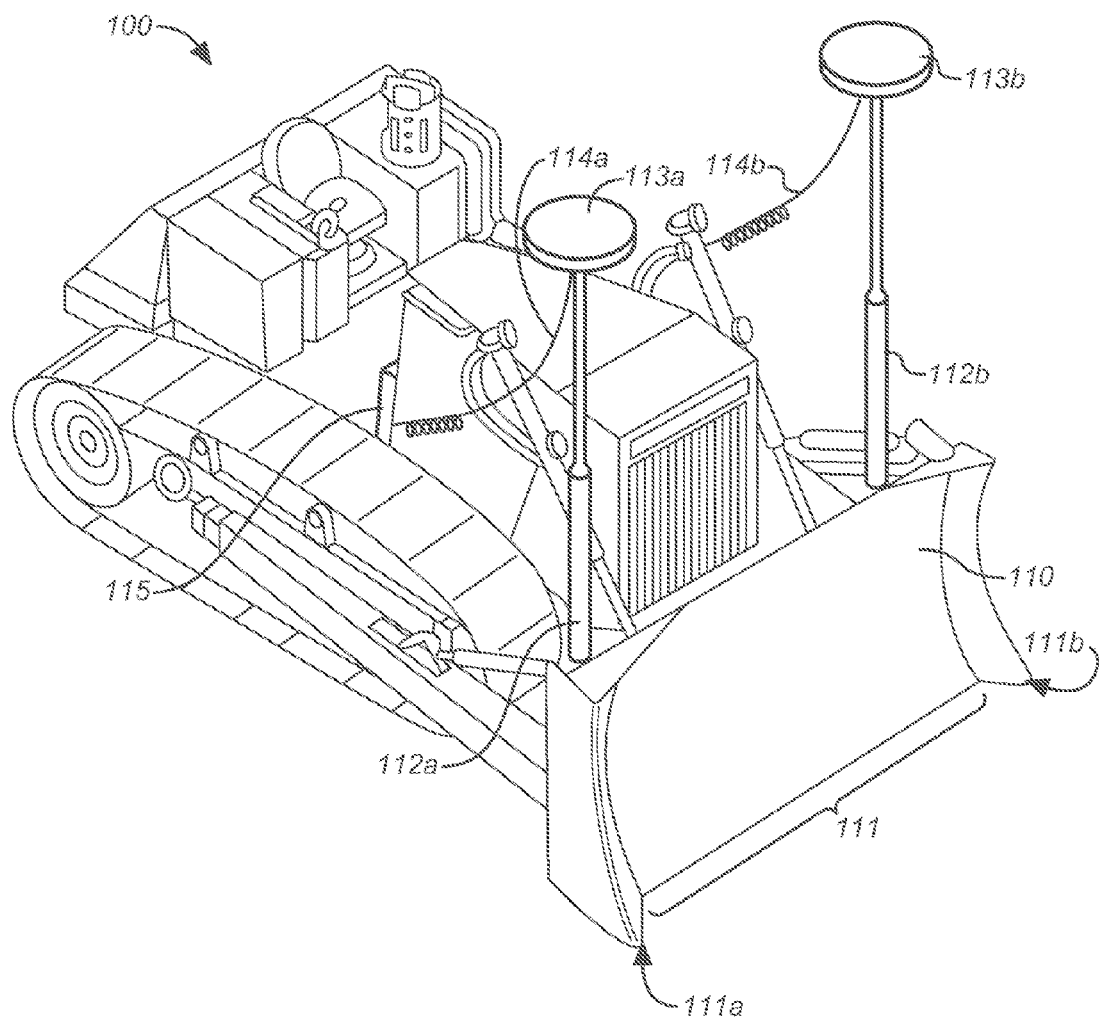
FIG. 1 shows a bulldozer using an exemplary prior art positioning system.
Figure 2:
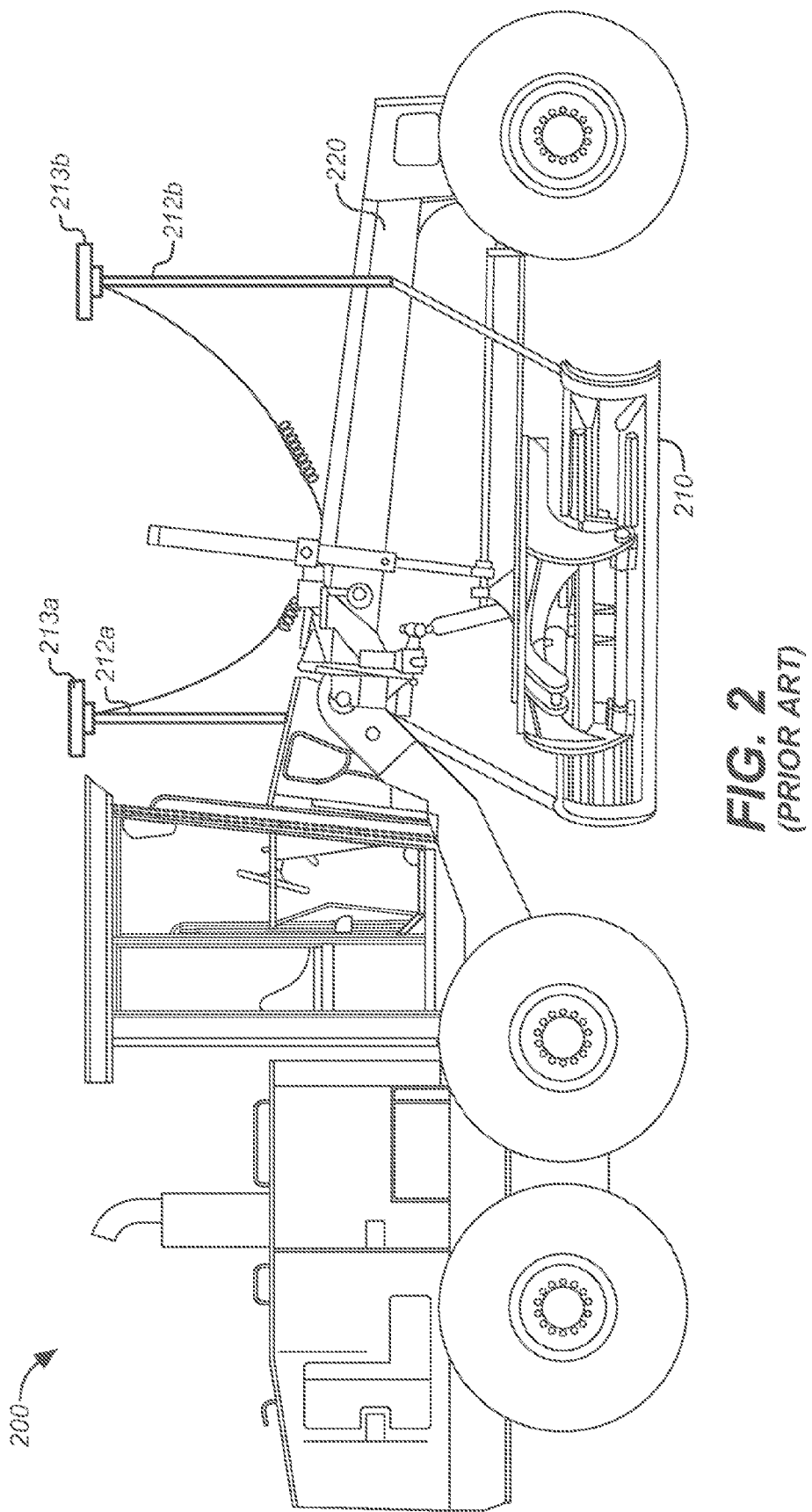
FIG. 2 shows a motor grader using an exemplary prior art positioning system.
Figure 3:
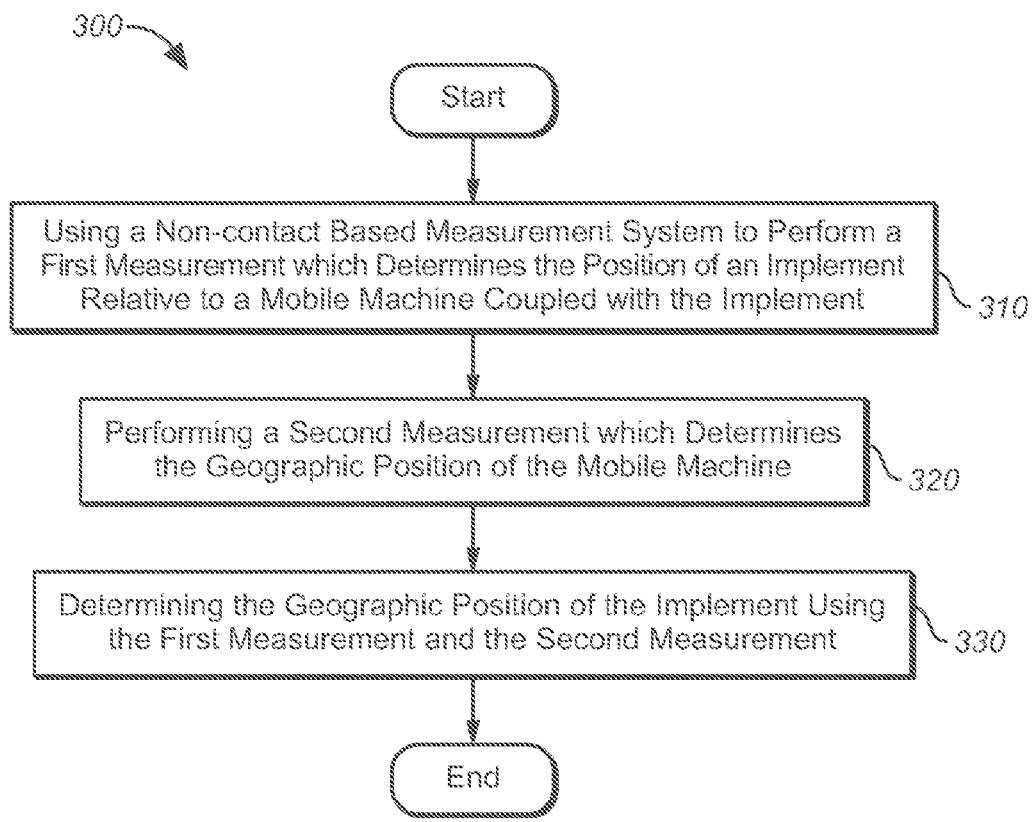
FIG. 3 is a flowchart of a method for performing non-contact based determination of the position of an implement in accordance with embodiments of the present invention.

FIG. 3 is a flowchart of a method for performing non-contact based determination of the position of an implement in accordance with embodiments of the present invention. In step 310 of FIG. 3, a non-contact based measurement system is used to perform a first measurement which determines the position of an implement relative to a mobile machine to which the implement is coupled. For the purposes of the invention described herein, a non-contact based measurement system refers to a measurement system which determines the position of an implement relative to a mobile machine to which it is coupled without requiring measurement of the position of each component comprising the mechanical linkage coupling the implement and the mobile machine.

As will be described in greater detail below, embodiments of the present invention determine the position of an implement such as the blade of a bulldozer or motor grader, the bucket of an excavator, or an implement using a measurement system which does not rely upon mechanical contact between a point of interest on the implement and the measuring instrument. For example, in embodiments of the present invention, determining the position of the machine's implement does not require measurement of the extension of each of the hydraulic cylinders used to control and manipulate the implement. In embodiments of the present invention, measurement of the distance and/or angle between a reference point on the mobile machine and a reference point on the implement is made.

In step 320 of FIG. 3, a second measurement which determines the geographic position and orientation of said mobile machine is performed. More specifically, embodiments of the present invention determine, in at least one dimension, the position of a reference point of a mobile machine. For example, measurement of the elevation of the mobile machine may be determined. Alternatively, the two dimensional geographic position (e.g., latitude and longitude) of the mobile machine may be determined or a combination of the elevation and two dimensional geographic position, While the present embodiment recites these examples specifically, it is appreciated that embodiments of the present invention are well suited for utilizing a variety of metrics and combinations thereof for determining the geographic position of the mobile machine.

Embodiments of the present invention use a position determining apparatus mounted on a mobile machine to determine the position of the mobile machine in at least one dimension (e.g., latitude, longitude, and elevation) or a combination thereof. Examples of mobile machines which can use embodiments of the present invention include, but are not limited to, a bulldozer, a motor grader, an excavator, a skid-steer loader, a scraper, a trencher, a trimmer, a tractor with an attachment (e.g., a grading attachment), a paver (e.g., a concrete or an asphalt paver), and a slip form concrete machine (e.g., a curb and gutter machine). It is appreciated that the term "excavator" may refer to a standard excavator, a tilting bucket excavator, a rotating bucket excavator, as well as other configurations utilizing extra boom and stick components or front bucket configurations. While these particular mobile machines are recited, embodiments of the present invention are well suited to be implemented in a variety of mobile machines used in agricultural, industrial, construction, mining, military, commercial, and consumer applications.

Embodiments of the present invention may utilize a variety of terrestrial-based position determining systems such as LORAN-C, Decca, radio beacons, etc. Embodiments of the present invention may utilize a commercially available terrestrial-based position determining system such as the ATS series manufactured by Trimble Navigation Ltd. of Sunnyvale Calif. Furthermore, the present invention is well suited to utilize future implementations of terrestrial-based position determining systems, e.g., the Rosum positioning technology. Additionally, embodiments of the present invention may utilize a variety of satellite-base position determining systems which can be utilized by embodiments of the present invention such as the Global Positioning System (GPS), Differential GPS (DGPS), Eurofix DGPS, the Global Navigation Satellite System (GLONASS), etc. Furthermore, the present invention is well suited to utilize future implementations of satellite-based position determining systems.

Embodiments of the present invention may also utilize position determining system which is located proximate to the mobile machine. In one embodiment, the present invention utilizes a Real-Time Kinematics (RTK) position determining system or a networked RTK system. RTK position determining systems typically use two or more communicatively coupled GPS receivers to determine a position of one receiver relative to the other receiver.

In a typical RTK system, a first GPS receiver is located at a known position, often a surveyor's landmark or benchmark, or an otherwise surveyed position, and the pseudorange data it collects is sent to the second GPS receiver, often referred to as a "rover," via a radio communications link. The rover is used to determine the relative position of desired points according to the needs of the survey effort. Thus there is a radio transmitter associated with the first receiver, called a reference receiver or a base station receiver, and a radio receiver at the rover. Pseudorange data from the satellites in view from the first receiver at the base station location is combined with data taken at the second rover receiver, and is processed at the rover according to well-known RTK methods to develop a position of the rover relative to the base station position. Embodiments of the present invention may adapt the RTK system wherein the roving GPS unit is mounted in the mobile machine.

Network RTK, also referred to as a "Virtual Reference Station system" typically uses three or more GPS reference stations to collect GPS data and extract information about the atmospheric and satellite ephemeris errors affecting signals within the network coverage region. Data from all the various reference stations is transmitted to a central processing facility, or VRS control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudorange correction comprising the actual pseudoranges that would be received at the specified base station location, now referred to as the Virtual Reference Station, and pseudorange corrections applicable to the region surrounding that location. The corrected pseudoranges calculated at the VRS control center are then delivered to the mobile machine. As will be discussed below, embodiments of the present invention may use other systems for determining the geographic position and orientation of the mobile machine. Other ground-based position determining systems used in accordance with embodiments of the present invention may use radio signals to determine the geographic position of a base station and an optical system (e.g., laser) to determine the position of the mobile machine relative to the base station. In another embodiment, a combination of a terrestrial-based position determining system and a satellite-based position determining system are used to determine the position of the mobile machine.

In embodiments of the present invention, the orientation (e.g., the direction, roll, pitch, yaw, or a combination thereof) of the mobile machine is determined as well its geographic position. As a result, the orientation of the implement can be derived as well. There are a variety of methods for determining the orientation of the mobile machine in accordance with embodiments of the present invention. These methods include, but are not limited to using a compass and/or one or more gyroscopes, tilt sensors, and/or accelerometers.

It is appreciated that steps 310 and 320 do not have to be performed in a specific order. That is, step 320 may precede step 310, or the steps may be performed simultaneously in accordance with embodiments of the present invention. Additionally, a plurality of measurements for determining the position of the implement may correspond to a single measurement of the geographic position of the mobile machine, or vice versa, in accordance with embodiments of the present invention.

In step 330 of FIG. 3, the geographic position and orientation of the implement is determined using the first measurement and the second measurement. In embodiments of the present invention, a control unit (e.g., mounted on the mobile machine) uses the first measurement of the pos lion of the implement relative to a point on the mobile machine and the second measurement of the geographic position and orientation of the mobile machine to determine the geographic position and orientation of the implement. In so doing, the present invention accurately determines the geographic position and orientation of a point of interest on the implement such as the blade edge of a bulldozer, motor grader or the edge of a bucket of an excavator. More specifically, embodiments of the present invention may determine the geographic position of a point of interest on an implement without necessitating the use of blade mounted geographic position sensors coupled with the implement. Additionally, embodiments of the present invention determine the geographic position of a point of interest of the implement without requiring measurement of the position of each component comprising the mechanical linkage coupling the implement and the mobile machine. As a result, embodiments of the present invention do not restrict the range of motion of the implement being measured, can be readily installed as an after-market kit, and do not subject the components to less damage than conventional implementations.

Figure 4:
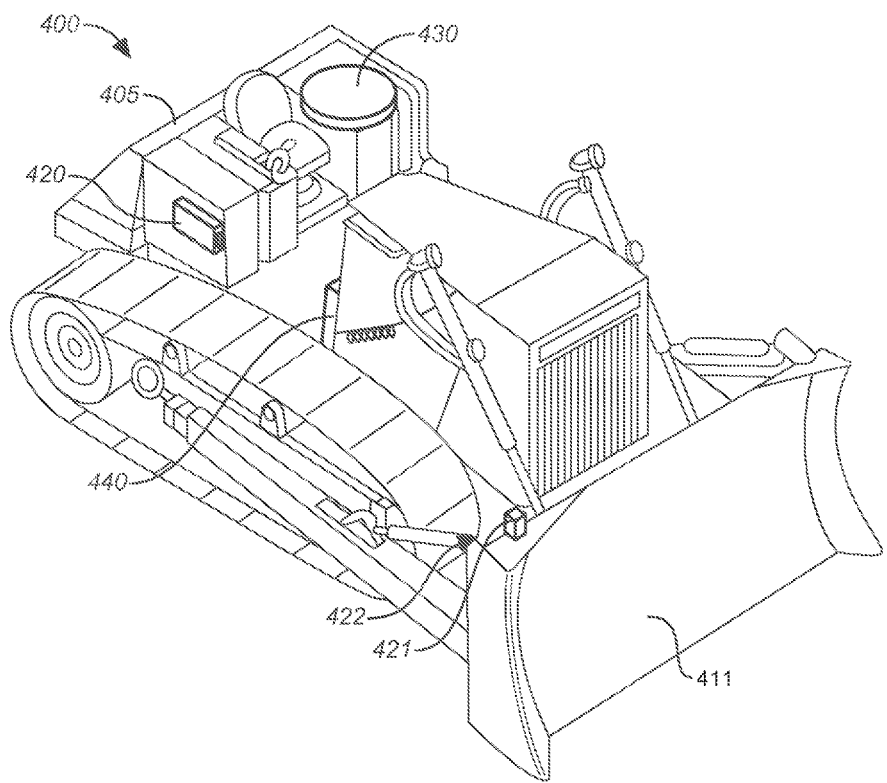
FIG. 4 shows a system for performing non-contact based determination of the position of an implement in accordance with embodiments of the present invention.

FIG. 4 shows a system 400 for performing non-contact based determination of the position of an implement in accordance with embodiments of the present invention. In the embodiment of FIG. 4, a non-contact based measurement system is used to determine the position of blade 410 relative to bulldozer 405. There are a variety of non-contact based measurement systems that can be used to determine the position of blade 410 in accordance with embodiments of the present invention.

In the embodiment of FIG. 4, an image recognition apparatus, comprising an optical receiver 420 coupled with bulldozer 405, and a visual indicator 421, is used to determine the position of blade 410 relative to bulldozer 405. In one embodiment, optical receiver 420 comprises a digital camera or one or more charged coupled devices (CCD). In this embodiment, optical receiver 420 monitors the position of visual indicator 421 and determines when it has moved from a first position to a second position. In embodiments of the present invention, visual indicator 421 may comprise a recognizable image such as a light emitter (e.g., a visible light, an infra-red emitter, one or more light emitting diodes (LEDs), etc.), a bar-code, a bullseye or other graphic image, etc. Alternatively, visual indicator 421 may be an identifiable portion of blade 420 itself such as the upper right corner 422 of blade 420.

When blade 420 is moved from a first position to a second position relative to bulldozer 405 (e.g. from a raised position to a lowered position), optical receiver 420 sends the position data of the blade to a control unit 440 which determines the position of working edge 411. This is possible because the position of working edge 411 is known with respect to visual indicator 421.

In embodiments of the present invention, determining the position of working edge 411 may comprise detecting the pixel position of visual indicator 421 at a first position using optical receiver 420 and detecting the pixel position of visual indicator 421 in a second position. Using this data, control unit 440 determines how far working edge 411 has moved by determining how many pixels separate the two images. In another embodiment, optical receiver 420 automatically tracks or aligns itself with visual indicator 421 using servo-motors. Control unit 440 determines the angular difference between a first position and a second positron of camera 420 when blade 410 is moved. There are a variety of systems known in the art which use a camera to automatically track a moving visual target. Because the distances between optical receiver 420, visual indicator 421, and working edge 411 are known, the present invention can derive the position of working edge 411 relative to bulldozer 405 by using optical receiver 420 to track visual indicator 421.

System 400 also comprises a position determination system 430 for determining the geographic positron and orientation of bulldozer 405. As discussed above with reference to FIG. 3, embodiments of the present invention may utilize a terestrial-based, a satellite-based (e.g., GPS) position determination system, or a combination thereof. Additionally, the position determination system may be located on bulldozer 405 or at a location proximate to bulldozer 405.

In embodiments of the present invention, a RTK base station may be used to determine the geographic position of bulldozer 405. Embodiments of the present invention may also utilize a networked RTK system, also known as a "virtual reference station" or "VRS" system, to determine the geographic position of bulldozer 405 with a greater degree of precision than is possible using an un-aided GPS position fix. For example, un-aided GPS unit can fix its geographic position with a resolution of approximately 10 meters. However, when the pseudorange data from a VRS control center is correlated with the initial position fix performed by bulldozer 405, a resolution of 1 centimeter over 10 kilometers is realized in the horizontal plane, and 2 centimeters over 10 kilometers is realized in the vertical plane is real zed.

Another example of a position determination system located proximate to a mobile machine is described in International Patent Application number WO 99/28565, entitled "A Device and Method for Determining the Position of a Working Part," by Lars Eriksson and Mikael Hertzman, and incorporated as reference herein in its entirety. In the patent application a reference station is placed in proximity to a working machine. The geographic position of the reference station is determined and the reference station then automatically tracks the working machine as it moves. The working machine utilizes accelerometers to detect more rapid movements of the machine than might be detected by the reference station.

In another embodiment, the present invention uses a pair of laser reference stations which are located at a known distance from each other proximate to the mobile machine. The geographic position of the reference stations is determined and angle of intercept from both reference stations to a target point (e.g., a reference point on bulldozer 405) is determined. Using this information, it is possible to derive the distance from the reference stations to the target point, thus determining the geographic position of the target point. Embodiments of this type of position determination system are known in the art and may be utilized in embodiments of the present invention.

For clarity, it will be assumed that in the embodiment of FIG. 4 position determination system 430 comprises a GPS unit mounted on bulldozer 405 to determine the geographic position of the bulldozer. It is appreciated that embodiments of the present invention position determination system 430 determines the geographic position of bulldozer 405 in at least one dimension. That is, the latitude, longitude, elevation, or a combination thereof of a reference point on bulldozer 405 may be determined in embodiments of the present invention.

As described above, system 400 further comprises a control unit 440 for determining the geographic position and orientation of working edge 411 using the data from the position determination system and the non-contact based measurement of the position of blade 410. In embodiments of the present invention, this functionality may be Incorporated in GPS unit 430, or performed by a separate component (e.g., control unit 440). Additionally, components for determining the orientation of bulldozer 405 may be incorporated in control unit 440, GPS unit 430 or a separate unit (not shown) which is communicatively coupled with control unit 440.

As described above, system 400 performs non-contact based determination of the position of an implement (e.g., blade 410 of FIG. 4). More specifically, the geographic position of working edge 411 is determined by the present invention without the necessity of measuring the position of each component coupling working edge 411 with bulldozer 405. Additionally, system 400 is a does not require mounting components of the system on masts coupled with bulldozer 405 or blade 410. As a result, the components of system 400 are not as exposed to damage from dirt, branches, brush, etc., than is realized using present systems.

Embodiments of system 400 may also be implemented without restricting the range of motion of the implement or the mobile machine utilizing the implement. As described above, mast mounted sensors can physically restrict the range of motion of the implement for certain types of machines such as motor graders. Additionally, operators of some machines may be reluctant to use the machines in heavy brush or wooded areas to avoid damaging the exposed position sensors. Embodiments of system 400 may be installed upon bulldozer 405 as an after market kit. In other words, camera 420, visual indicator 421, position determination system 430, and control unit 440 may be purchased separately from bulldozer 405 and installed after bulldozer 405 has been manufactured.

FIGS. 5A and 5B show a non-contact based measurement system 500 used in accordance with embodiments of the present invention. In one embodiment of FIGS. 5A and 5B, system 500 is a light-based measurement system comprising an emitter/detector 510 coupled with mobile machine 520 (e.g., a bulldozer, motor grader, excavator, etc.), and a reflector 530 coupled with implement 540 (e.g., a blade of a bulldozer or motor grader, or the bucket of an excavator). in embodiments of the present invention, light in the visible spectrum or non-visible spectrum can be used in system 500. For example, in one embodiment, emitter/detector 510 may comprise a laser system which measures changes in the position of reflector 530 when implement 540 is moved from a first position to a second position relative to mobile machine 520. In another embodiment, system 500 uses, for example, light infra-red light to measure the position of implement 540.

In embodiments of the present invention, emitter/detector 510 detects a change in the angle to reflector 530 when implement 540 is moved relative to mobile machine 520. For example, in one embodiment emitter/detector 510 detects movement of implement 540 by detecting the change in the incidence angle of light reflected back from reflector 530, In another embodiment of the present invention, emitter/detector 510 is a servo-controlled optical unit which automatically aligns with reflector 530 in response to changes in the position of implement 540. The alignment of emitter/detector 510 can be used to determine position of implement 540 relative to mobile machine 520.

Alternatively, emitter/detector 510 may detect a change in the distance to reflector 530 when implement 540 is moved relative to mobile machine 520. In embodiments of the present invention, emitter/detector 510 is a distance determination unit which detects changes in the distance to reflector 530 when implement 540 is moved from a first position to a second position relative to mobile machine 520. In embodiments of the present invention, determining the distance between emitter/detector 510 and reflector 530 may be accomplished using light (e.g., a laser system), sound (e.g., ultrasonic), or radio systems. In another embodiment, emitter/detector 530 can detect a change in both the distance and angle to reflector 530 when implement 540 is moved relative to mobile machine 520.

In embodiments of the present invention, reflector 530 comprises a retro reflector. Retroreflectors are sometimes called "corner cubes" because the reflecting surfaces are typically three mutually perpendicular faces like the corner of a cube. Light entering a retroreflector is reflected back 180° and parallel to the original beam, regardless of its orientation to the beam. With reference to FIG. 5A, light from emitter/detector 510 is reflected back 180 and is then detected by emitter/detector 510. While the present embodiment recites a retro reflector specifically, embodiments of the present invention may utilize a variety of reflecting devices or targets to determine the position of implement 540.

It is appreciated that in embodiments of the present invention more than one emitter/detector 510 and/or reflector 530 may be used to determine the position of implement 540. For example, when used to measure the position of the blade of a motor grader, system 500 may use a plurality of emitter/detectors and reflectors to determine the three dimensional position of the blade relative to the motor grader. In one embodiment, more than one emitter/detector may be associated with a single reflector or vice versa. Alternatively, embodiments of the present invention may use one system to determine a change in the angle between an emitter/detector and its associated reflector and a second system to determine a change in the distance between a second emitter/detector and its associated reflector.

Referring now to FIG. 5E, an emitter 550 is coupled with implement 540 and detector 560 is coupled with mobile machine 520. In embodiments of the present invention, emitter 550 may comprise a laser emitter, an infra-red emitter, a light emitting diode (LED), a radio emitter, a sound emitter, etc. Embodiments of the present invention use detector 560 to determine when implement 540 is moved from a first position to a second position relative by detecting the difference in incidence angle from emitter 550, or the distance between emitter 550 and detector 560. In another embodiment of the present invention, detector 560 is a servo-controlled optical unit which automatically aligns with emitter 550 in response to changes in the position of implement 540. The alignment of detector 560 can be used to determine position of implement 540 relative to mobile machine 520. In another embodiment, detector 560 detects a phase difference in light from emitter 550 when implement 540 is moved from a first position to a second position relative to mobile machine 520.

In other embodiments of the present invention, system 500 comprises a sound-based measurement apparatus. Referring again to FIG. 5A, in embodiments of the present invention emitter/detector 510 is coupled with mobile machine 520 and emits an audible signal (e.g., an ultra-sonic signal) which is reflected by reflector 530 coupled with implement 540. For example, when implement 540 is moved from a first positron to a second position, a change in the frequency of the audio signal may allow determining the position of implement 540 relative to mobile machine 520. In another embodiment, emitter/detector 510 comprises a directional microphone which can automatically align with the reflected signal from reflector 540 (e.g., using servo-motors to track the strongest signal).

Referring again to FIG. 5B, an audio emitter 550 is coupled with implement 540 and detector 560 is coupled with mobile machine 520. Embodiments of the present invention use detector 560 to determine when implement 540 is moved from a first position to a second position relative by detecting the change in frequency or signal strength of the audio signal from emitter 550. In another embodiment of the present invention, detector 560 is a servo-controlled directional microphone which automatically aligns with emitter 550 in response to changes in the position of implement 540. The alignment of detector 560 can be used to determine position of implement 540 relative to mobile machine 520. In embodiments of the present invention, audio emitter 550 is coupled with mobile machine 520 and detector 560 is coupled with implement 540.

FIG. 6 shows a non-contact based measurement system 600 implemented on a motor grader in accordance with embodiments of the present invention. In one embodiment a plurality of emitter/detectors 610 are coupled with motor grader 605. Additionally, a plurality of reflectors 620 are coupled with blade 630. In embodiments of the present invention, emitter/detectors 610 and reflectors 620 may comprise either a light-based or sound-based measurement system as described above with reference to FIGS. 5A and 5B. Additionally, reflectors 620 and emitter/detectors 610 may detect a change in angle, a change in distance, or both when bade 630 is moved relative to motor grader 605. While the embodiment of FIG. 6 shows 4 emitter/detectors 610, embodiments of the present invention may utilize more or fewer emitter/detectors based upon the system requirements.

In another embodiment, a plurality of detectors 610 are coupled with motor grader 605 and a plurality of emitters 620 are coupled with blade 630. As discussed above with reference to FIGS. 5A and 5B, detectors 610 and emitters 620 may comprise a light-based or sound-based measurement system in embodiments of the present invention. Additionally, emitters 620 and detectors 610 may detect a change in angle, a change in distance, or both when blade 630 is moved relative to motor grader 605. While the embodiment of FIG. 6 shows 4 detectors 610, embodiments of the present invention may utilize more or fewer detectors based upon the system requirements. Embodiments of the present invention may also utilize an image recognition apparatus as described above with reference to FIG. 4 on a motor grader.

Figure 7:
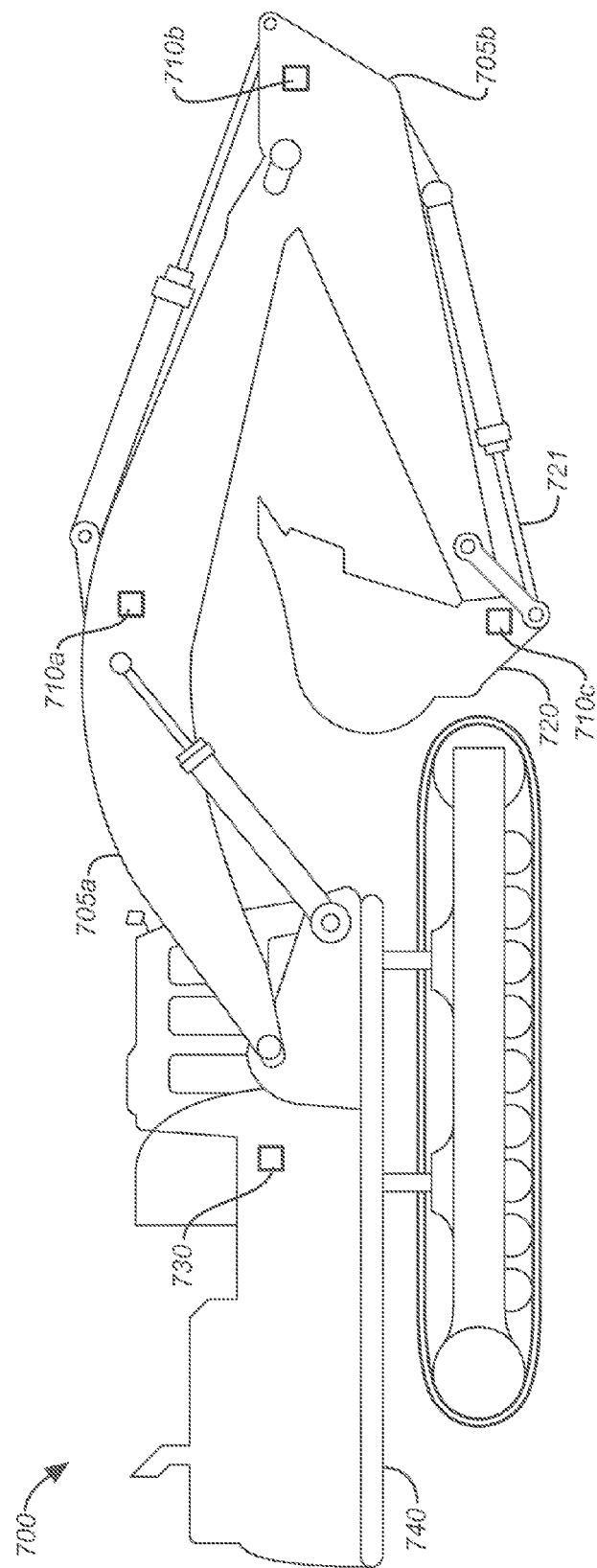
FIG. 7 shows an excavator using a non-contact based measurement system in accordance with embodiments of the present invention.

FIG. 7 shows an excavator using a non-contact based measurement system in accordance with embodiments of the present invention. In the embodiment of FIG. 7, a plurality of sensors (e.g., 710a-710c) are coupled with excavator 705. In embodiments of the present invention, each of sensors 710a-710c detects changes in the position of the component of the boom to which the respective sensor is attached. For example, in FIG. 7, sensor 710a is coupled with arm 705a, gravity sensor 710b is coupled with arm 705b, and gravity sensor 710c is coupled with bucket 720. As bucket 720 is moved, sensors 710a-710c detect the angular changes relative to the ground to determine the extension of arm 705. In an embodiment of the present invention, sensor 710c comprises a cylinder extension sensor for determining the position of bucket 720 by determining the extension of the hydraulic cylinder 721. Using an extension sensor is advantageous in some situations such as when bucket 720 may be immersed in water or below the ground level (e.g., when digging a trench). In such an instance, the operation of a light-based or sound based measurement apparatus may be hindered due to discontinuities in the line of sight between bucket 720 and excavator 700. In one embodiment, the position data from cylinder extension sensor 710c as well as from sensor(s) 710a and/or 710b is sent to control unit 730 wirelessly. It is appreciated that position data from each of arm 710a, 710b and bucket 720 are not necessary for control unit 730 to determine the position of bucket 720. Because the geometry of the arms which couple cabin 740 with bucket 720 is known, the position of the working edge of bucket 720 can be determined using data describing the extension of hydraulic cylinder 721 and, for example, the position of sensor 710b. An additional sensor (not shown) may be used to detect horizontal rotation of cabin 740. In other embodiments of the present invention, the angle of extension of one of the arms 705a or 705b or bucket 720 may be determined using a tilt sensor or an angle extension sensor and transmitted to control unit 730.

The preferred embodiment of the present invention, a method and system for performing non-contact based determination of an implement, is thus described. While the present invention has been described in particular embodiments, it should be appreciated that the present invention should not be construed as limited by such embodiments, but rather construed according to the following claims.

What is claimed is:

1. A non-contact position determination system comprising:
   a bulldozer comprising an implement coupled therewith;
   a first system configured for determining without contact a position of said implement relative to said bulldozer and for determining a difference in incidence angle between the implement and a particular part of said bulldozer;
   said first system including an incidence angle detection component comprising:
     an emitter coupled with said implement; and
     a detector coupled with said particular part of said bulldozer and configured to receive a one-way transmission of a light that travels without changing direction from said emitter, wherein said incidence angle detection component is configured for determining said incidence angle between said implement and said particular part of said bulldozer based on said one-way transmission of said light from said emitter and for using said incidence angle to determine said position of said implement relative to said bulldozer;
   a second system configured for determining a geographic position of said bulldozer; and
   a control system configured for determining a geographic location of said implement using data from said first system and said second system.

2. The system of claim 1 wherein said second system comprises a terrestrial-based position determination system.

3. The system of claim 1 wherein said second system comprises a satellite-based position determination system.

4. The system of claim 1 wherein said second system comprises a system which combines a terrestrial-based position determining system with a satellite-based position determining system.

5. The system of claim 1 wherein said second system is located proximate to said bulldozer.

6. The system of claim 1 wherein said emitter generates a beam of light in the visible spectrum and said light-based measurement apparatus determines the position of said implement by measuring a phase-shift of said beam of light or determining a time-of-flight of said beam of light between said emitter and said detector.

7. The system of claim 1 wherein said emitter generates a beam of light in the non-visible spectrum and light-based measurement apparatus determines the position of said implement by measuring a phase-shift of said beam of light or determining a time-of-flight of said beam of light between said emitter and said detector.

8. The system of claim 1 wherein said first system determines a difference in an angle between said implement and said bulldozer when said implement is moved from a first position to a second position.

9. The system of claim 1 wherein said first system determines a difference in a distance between said implement and said bulldozer when said implement is moved from a first position to a second position.

10. The system of claim 1 wherein said control system further determines an orientation of said bulldozer.

11. A non-contact position determination system comprising:
   a motor grader comprising an implement coupled therewith;
   a first system configured for determining without contact a position of said implement relative to said motor grader and for determining a difference in incidence angle between the implement and a particular part of said motor grader;
   said first system including an incidence angle detection component comprising:
     an emitter coupled with said implement; and
     a detector coupled with said particular part of said motor grader and configured to receive a one-way transmission of a light that travels without changing direction from said emitter, wherein said incidence angle detection component is configured for determining said incidence angle between said implement and said particular part of said motor grader based on said one-way transmission of said light from said emitter and for using said incidence angle to determine said position of said implement relative to said motor grader;
   a second system configured for determining a geographic position of said motor grader; and
   a control system configured for determining a geographic location of said implement using data from said first system and said second system.

12. The system of claim 11 wherein said second system comprises a terrestrial-based position determination system.

13. The system of claim 11 wherein said second system comprises a satellite-based position determination system.

14. The system of claim 11 wherein said second system comprises a system which combines a terrestrial-based position determining system with a satellite-based position determining system.

15. The system of claim 11 wherein said second system is located proximate to said motor grader.

16. The system of claim 11 wherein said emitter generates a beam of light in the visible spectrum and said light-based measurement apparatus determines the position of said implement by measuring a phase-shift of said beam of light or determining a time-of-flight of said beam of light between said emitter and said detector.

17. The system of claim 11 wherein said emitter generates a beam of light in the non-visible spectrum and said light-based measurement apparatus determines the position of said implement by measuring a phase-shift of said beam of light or determining a time-of-flight of said beam of light between said emitter and said detector.

18. The system of claim 11 wherein said first system determines a difference in an angle between said implement and said motor grader when said implement is moved from a first position to a second position.

19. The system of claim 11 wherein said first system determines a difference in a distance between said implement and said motor grader when said implement is moved from a first position to a second position.

20. The system of claim 11 wherein said control system further determines an orientation of said motor grader.

21. A non-contact position determination system comprising:
   a mobile machine comprising an implement coupled therewith;
   a first system configured for determining without contact a position of said implement relative to a mobile machine coupled with said implement, said first system including an angle measuring component comprising:
      an emitter coupled with said implement; and
      a detector coupled with said mobile machine and configured to receive a one-way transmission of a light that travels without changing direction from said emitter, wherein said angle measuring component is configured for determining an angle between said implement and said mobile machine based on said one-way transmission of said light and for using said angle to determine said position of said implement relative to said mobile machine;
   a second system configured for determining the geographic position of said mobile machine; and
   a control system configured for determining the geographic position of said implement based upon data received from said first system and said second system.

22. The system of claim 21 wherein said mobile machine is selected from the group consisting of a bulldozer, a motor grader, an excavator, a skid-steer loader, a scraper, a trencher, a trimmer, a tractor with an attachment, a paver, and a slip form concrete machine.

23. The system of claim 21 wherein said second system comprises a terrestrial-based position determination system.

24. The system of claim 21 wherein said second system comprises a satellite-based position determination system.

25. The system of claim 21 wherein said second system comprises a system which combines a terrestrial-based position determining system with a satellite-based position determining system to determine a second measurement.

26. The system of claim 21 wherein said second system is located proximate to said mobile machine.

27. The system of claim 21 wherein said emitter is configured to generate and emit said light in the visible spectrum.

28. The system of claim 21 wherein said emitter is configured to generate and emit said light in the non-visible spectrum.

29. The system of claim 21 wherein said first system is configured to determine a difference in an angle between said implement and said mobile machine when said implement is moved from a first position to a second position.

30. The system of claim 21 wherein said first system is configured to determine a difference in the distance between said implement and said mobile machine when said implement is moved from a first position to a second position.

31. The system of claim 21 wherein said second system is further configured to determine the orientation of said mobile machine.

* * * * *